United States Patent [19]

Matsueda

[11] Patent Number: 5,420,849
[45] Date of Patent: May 30, 1995

[54] APPARATUS FOR REPRODUCING DATA FROM OPTICAL DATA RECORDING MEDIUM

[75] Inventor: Akira Matsueda, Tokyo, Japan

[73] Assignee: Olympus Optical Co., Ltd., Tokyo, Japan

[21] Appl. No.: 231,239

[22] Filed: Apr. 22, 1994

[30] Foreign Application Priority Data

Apr. 26, 1993 [JP] Japan ................................. 5-099460
Nov. 8, 1993 [JP] Japan ................................. 5-278278

[51] Int. Cl.⁶ .......................... G06K 1/00; G11B 7/00
[52] U.S. Cl. .................................. 369/124; 369/275.3;
369/59; 235/494; 235/487; 235/454
[58] Field of Search ...................... 369/124, 275.3, 59;
235/494, 487, 454

[56] References Cited

U.S. PATENT DOCUMENTS 5,091,635  2/1992  Akatsuka et al. .................. 235/494

FOREIGN PATENT DOCUMENTS

3-173980  7/1991  Japan .

Primary Examiner—Viet Q. Nguyen
Attorney, Agent, or Firm—Frishauf, Holtz, Goodman & Woodward

[57] ABSTRACT

An optical data reproducing apparatus detects a moving speed of an optical card and correct reproduced data in accordance with the detected speed in order to compensate for a speed variation of the optical card, Two read beams which are separated by a given distance in a track direction are irradiated to the card and are detected by two detectors, The moving speed is detected based on a difference between detection timings of the two detectors with regard to a given pit. In order to make pit-to-pit correspondence between the detection timings of the two detectors, a sync portion is first detected and the last pit in the sync portion is numbered the first pit and the difference between the detection timings of the same ordered pits is calculated to obtain the moving speed, The sync portion is recorded as a plurality of pits arranged at regular intervals, Intervals of the pits are detected and a ratio of the intervals detected is compared with a predetermined ratio for representing a sync pattern.

8 Claims, 9 Drawing Sheets

| MEMORY ADDRESS | MEMORY DATA | DIFFERENCE | |
|---|---|---|---|
| 1 | 100 | 40 | ⎫ |
| 2 | 140 | 40 | |
| 3 | 180 | 40 | |
| ⋮ | | | PREAMBLE |
| 14 | 620 | 40 | |
| 15 | 660 | 40 | |
| 16 | 700 | 40 | ⎭ |
| 17 | 740 | 80 (2τ) | ⎫ |
| 18 | 820 | 160 (4τ) | SYNC. |
| 19 | 980 | 160 (4τ) | ⎭ |
| 20 | 1140 | 40 | ⎫ |
| 21 | 1180 | 40 | |
| ⋮ | | | |
| 102 | 8500 | 40 | |
| 103 | 8540 | 80 | DATA |
| 104 | 8580 | 40 | |
| 105 | 8700 | 120 | |
| ⋮ | | | ⎭ |
| 182 | 12740 | 80 (2τ) | ⎫ |
| 183 | 12900 | 160 (4τ) | SYNC. |
| 184 | 13060 | 160 (4τ) | ⎭ |
| ⋮ | | | ⎫ |
| 201 | 15220 | 40 | |
| 202 | 15260 | 40 | DATA |
| 203 | 15300 | 80 | |
| 204 | 15380 | 120 | ⎭ |

F I G. 11

F I G. 12

| MEMORY ADDRESS | PIT INTERVAL | | | EV1 | EV2 | | | |
|---|---|---|---|---|---|---|---|---|
| | X1 | X2 | X3 | | $\frac{X1}{EV1}$ | $\frac{X2}{EV1}$ | $\frac{X3}{EV1}$ | |
| 166 | 42 | 88 | 90 | 22.00 | 1.91 | 4.00 | 4.09 | 0.18 |
| 170 | 125 | 132 | 128 | 38.50 | 3.25 | 3.43 | 3.32 | 2.49 |
| 182 | 84 | 170 | 172 | 42.60 | 1.97 | 3.99 | 4.04 | 0.08 |
| 195 | 58 | 179 | 182 | 41.90 | 1.38 | 4.27 | 4.34 | 1.23 |

F I G. 13

F I G. 14

F I G. 15

APPARATUS FOR REPRODUCING DATA FROM OPTICAL DATA RECORDING MEDIUM

BACKGROUND OF THE INVENTION

1. Field of the Invention

The present invention relates to an optical data reproduction apparatus for reproducing data from an optical recording medium and, more particularly, to an optical data reproduction apparatus for performing reproduction scanning of data by moving a reproduction head relative to an optical data recording medium.

2. Description of the Related Art

In an optical recording medium such as an optical card, data is recorded by forming pits (non-reflecting portions) on a track (reflecting portion) at intervals according to recording data. Therefore, a reproduction apparatus detects the position of each pit by moving a reproduction head relative to a recording medium, thereby detecting the interval between each two adjacent pits. In order to accurately detect the pit interval, the relative moving speed between the recording medium and the reproduction head must always be constant.

However, in practice, upon mechanical driving of a recording medium such as an optical disk, an optical card, or the like, a certain speed variation inevitably occurs, and some countermeasure against the speed variation must be taken. In particular, in the case of the optical card, since a large number of parallel tracks extend in the longitudinal direction of the card, the card is linearly and reciprocally moved in its longitudinal direction. Therefore, since acceleration and deceleration are frequently performed, a speed variation occurs more easily than an optical disk which is always in a steady rotation state. Upon reproduction of data near the two ends of each track, the reproduced data are easily influenced by the speed variation.

In order to solve this problem, a conventional optical card reproduction apparatus uses a linear motor which suffers a less speed variation as a driving source for a card, or a linear encoder is attached to control the speed. However, these methods are not preferable since the cost and weight of the apparatus undesirably increase.

A method of detecting the moving speed of a medium from reproduced data, and correcting the reproduced data (pit interval) in accordance with the detected speed is proposed. The moving speed is detected on the basis of a time interval required when a certain pit passes across two detectors which are arranged on a track to be separated by a predetermined distance. With this method, reflection signals from a pit array on a single track are detected by the two detectors. Blank and preamble portions are detected from the output signals from the two detectors, thereby detecting the head position of recording data (a data portion). Then, a synchronization (sync) portion is detected, and the difference between the output timings of the two detectors is calculated by establishing a pit-to-pit correspondence using the last pit in the sync portion as the head pit of the data portion, thereby obtaining speed data. Thereafter, the pit interval (reproduced data) in the output signal from one detector is corrected in accordance with the speed data, thereby obtaining reproduced data which does not include any speed variation.

Note that the sync portion consists of a plurality of bits which are arranged according to a predetermined rule (which does not appear in a modulation rule). For example, the sync portion is recorded by four pits which are arranged at intervals $\tau$, $4\tau$, and $4\tau$. Therefore, in the conventional method, the sync portion is detected by discriminating whether or not the time differences of pits have the above-mentioned relationship $\tau$, $4\tau$, and $4\tau$.

However, according to this method, when the moving speed of the card varies, since the pit interval data varies accordingly, a correct sync pattern cannot be detected. When the output signal from the detector suffers omission or addition of pits (detection errors of pits), a pit pattern which is not originally a sync portion may be erroneously recognized as a sync portion. Such erroneous recognition easily occurs when the sync pattern is simple.

SUMMARY OF THE INVENTION

Accordingly, it is an object of the present invention to provide an optical data reproduction apparatus which can accurately detect an array of pits which are arranged according to a predetermined rule, even when the relative moving speed between a recording medium and a reproduction head varies.

According to the present invention, there is provided an optical data reproducing apparatus for detecting an pit array including a predetermined number of pits formed on an optical data recording medium at predetermined intervals according to a predetermined rule, the apparatus comprising:

means for detecting intervals of adjacent pits in the predetermined number of pits to detect a ratio of intervals of the predetermined number of pits; and means for calculating a degree of coincidence between the ratio of intervals detected by said detecting means and a ratio of intervals of the predetermined number of pits determined by the predetermined rule, thereby detecting the pit array based on the degree of coincidence.

According to the present invention, the intervals between adjacent pits in an array of pits which are recorded on a recording medium at predetermined intervals are detected, and whether or not a value obtained by normalizing the ratio of the intervals coincides with a predetermined ratio is discriminated to detect an array of pits which are arranged according to a predetermined rule, e.g., a sync portion, independently of the presence/absence of a speed variation.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of an optical data reproduction apparatus according to the present invention will now be described with reference to the accompanying drawings.

Figure 1:
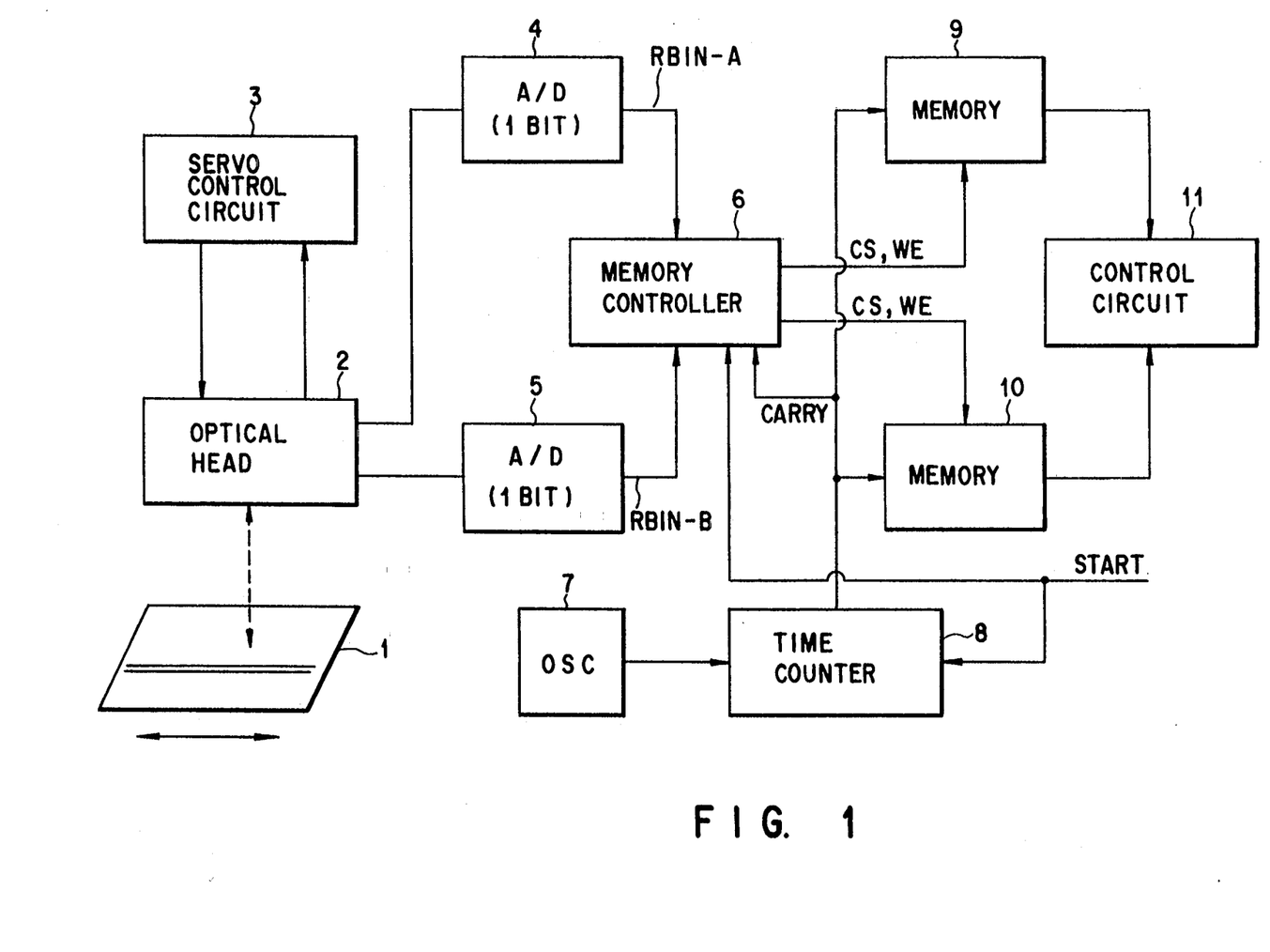
FIG. 1 is a block diagram showing the first embodiment of an optical data reproduction apparatus according to the present invention.

FIG. 1 is a block diagram showing the arrangement of the first embodiment. As an optical recording medium, for example, an optical card 1 is exemplified. The optical card 1 is reciprocally driven along its longitudinal direction by a driving means.

Figure 14:
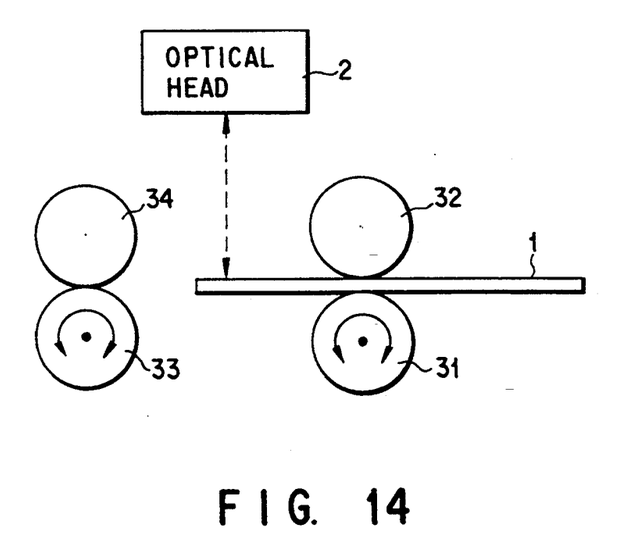
FIG. 14 is a view showing an example of a card driving mechanism.
Figure 15:
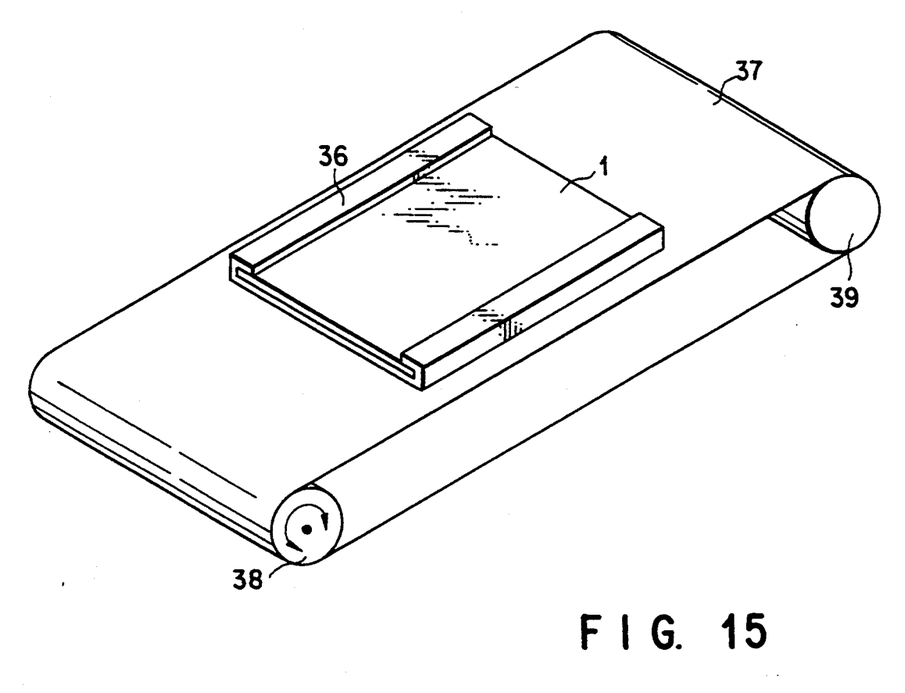
FIG. 15 is a view showing another example of a card driving mechanism.

Examples of the driving means are shown in FIG. 14 and FIG. 15. FIG. 14 illustrates that the card 1 is moved by a pair of a driving roller 31 and a following roller 32 at one end. Another pair of a driving roller 33 and a following roller 34 is provided to drive another end of the card 1. FIG. 15 illustrates the card 1 is attached on a shuttle 36 which is provided on an endless belt 37. The endless belt 37 is wounded on a driving roller 38 and a following roller 39 and is reciprocatedly driven.

An optical head 2 is arranged to oppose the optical card 1. Although not shown, the optical head 2 has a light source, a detector, an optical system, a focus servo actuator, and a track servo actuator, and generates two read beams. The two beams are radiated onto the optical card 1 to be separated by a predetermined interval in the track direction (longitudinal direction) of the optical card 1. More specifically, a diffraction grating is arranged on an optical path between the optical card 1 and the light source, and 0th- and 1st-order diffracted light components from the diffraction grating serve as the two read beams. The detector has a cell for detecting a pickup servo signal, and also has two cells for detecting the two read beams reflected by the card 1 and generating two read signals. Each read signal generating cell outputs a read signal corresponding to a pit when the corresponding read beam is radiated onto the pit on a track of the optical card 1.

The optical head 2 is connected to a servo control circuit 3. The servo control circuit 3 generates a servo error signal on the basis of a servo detection signal from the optical head 2, and drives the focus and track servo actuators in the optical head 2 in accordance with the servo error signal. Thus, the servo control circuit 3 controls the beams from the optical head 2, so that the beams maintain an in-focus state on a desired track on the optical card 1, and can trace the track so as not to fall outside the track upon movement of the card.

Two read signals output from the optical head 2 are respectively supplied to 1-bit A/D converters 4 and 5. The A/D converters 4 and 5 convert the read signal into a binary signal. These A/D converters 4 and 5 comprise known binarization circuits. More specifically, each A/D converter detects a peak (corresponding to the center of a recording pit) in the read signal using, e.g., a differential circuit and a comparator.

Figure 2:
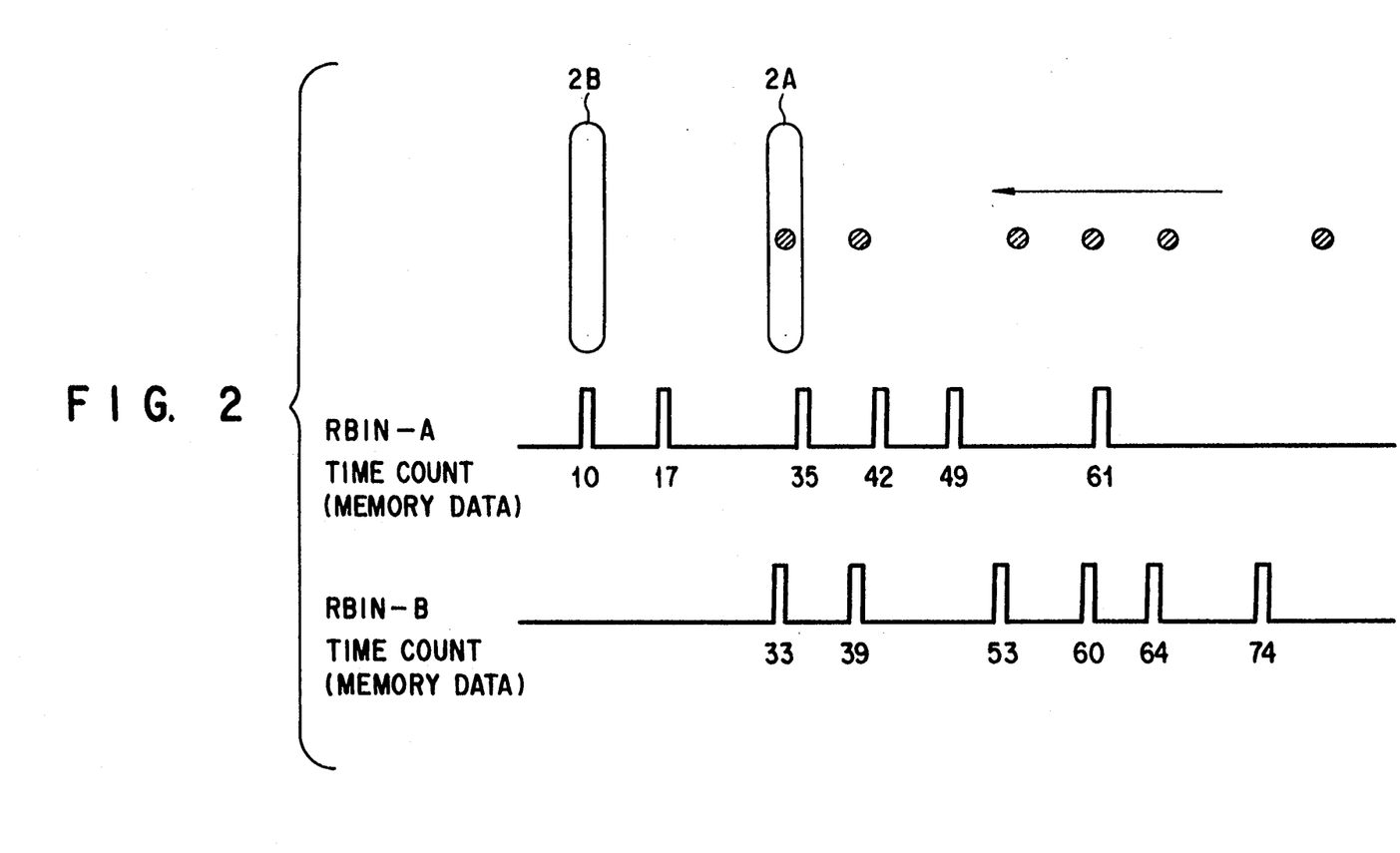
FIG. 2 is a view showing two read beams for detecting the moving speed of an optical card, binary signals corresponding to the two beams, and data to be written in a memory based on the binary signals.

FIG. 2 shows two read beams 2A and 2B. In this embodiment, since the optical head 2 is fixed in position, and the card 1 is moved relative to the optical head 2, the moving direction of a pit relative to the beams 2A and 2B corresponds to the direction of an arrow. The A/D converter 4 outputs a binary signal RBIN-A of the read signal corresponding to the read beam 2A, and the A/D converter 5 outputs a binary signal RBIN-B of the read signal corresponding to the read beam 2B. Referring to FIG. 2, numerical values described below the binary signals RBIN-A and RBIN-B indicate count values of a time counter 8 (to be described later) obtained when the corresponding binary signals are output.

Referring back to FIG. 1, the binary outputs from the A/D converters 4 and 5 are supplied to a memory controller 6. Upon reception of a driving start signal of an optical card driving means from a system control circuit (not shown), the memory controller 6 supplies chip select signals CS and write enable signals WE to memories 9 and 10 every time the binary signals are output from the A/D converters 4 and 5 (every time a pit is detected) and every time the counter 8 (to be described later) outputs a carry.

Figure 3:
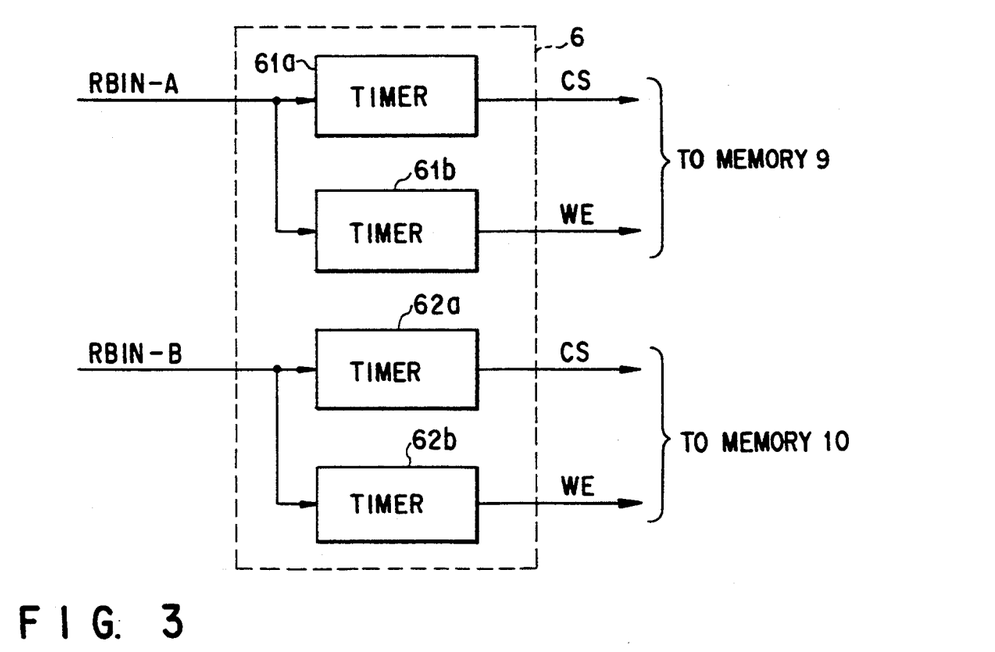
FIG. 3 is a detailed block diagram of a memory controller shown in FIG. 1.

FIG. 3 shows the detailed arrangement of the memory controller 6. Two timers 61a and 61b are triggered by the leading edge of the output signal RBIN-A from the A/D converter 4, and respectively output a chip select signal CS and a write enable signal WE to the memory 9. Also, two timers 62a and 62b are triggered by the leading edge of the output signal RBIN-B from the A/D converter 5, and respectively output a chip select signal CS and a write enable signal WE to the memory 10. The memories 9 and 10 are selected while the corresponding chip select signals CS are at low level, and allow a write access while the corresponding write enable signals WE are at low level.

Figure 4:
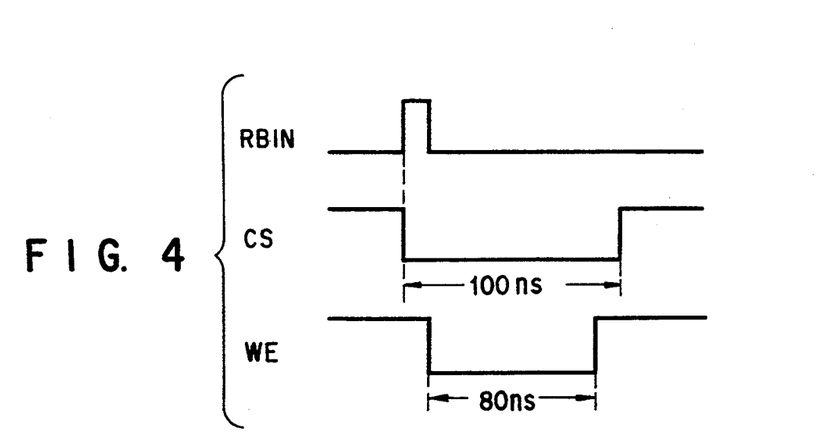
FIG. 4 is a timing chart showing input/output signals of the memory controller.

FIG. 4 shows an example of the time relationship among the binary signal RBIN from the A/D converter 4 or 5, the chip select signal CS, and the write enable signal WE. In FIG. 4, the active periods of the signals CS and WE are respectively 100 ns and 80 ns. However, actual times vary depending on memories to be used.

Referring back to FIG. 1, the memories 9 and 10 store the output (time-base count value or carry) from the time counter 8, which is driven by an oscillator 7, in accordance with the chip select signals CS and the write enable signals WE from the memory controller 6.

Figure 5:
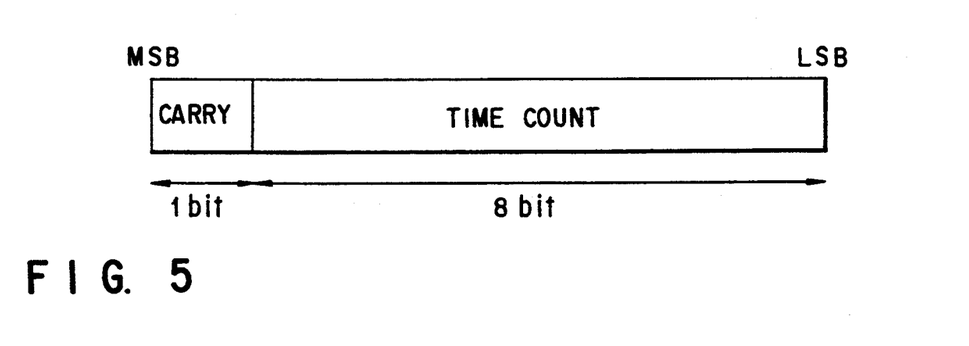
FIG. 5 is a view showing the word format of an output from a counter, which is written in the memory.

The format of one-word data output from the counter 8 consists of 9 bits, as shown in FIG. 5. In this word, the most significant bit (MSB) indicates (the presence/absence of) a carry, and 8 bits from the second bit to the least significant bit (LSB) indicate a time count. Thus, the data "100000000" is written into the memories 9 and 10 when the carry is output from the counter 8.

The memories 9 and 10 are connected to a control circuit 11. The control circuit 11 performs detection of moving speed, detection of pit interval, correction of pit interval data, and demodulation of the corrected pit interval data on the basis of data stored in the memories 9 and 10.

The operation of the embodiment with the above-mentioned arrangement will be described below. Prior to reading of data, the optical head 2 is started by the system control circuit (not shown) to locate one of the two beams at one end of a desired track on the optical card 1, and focus and track servo control operations are started. Then, an instruction is issued to a card driving circuit (not shown) to drive the optical card 1 in the longitudinal direction of the card. Thus, the card driving circuit starts the driving operation of the card (starts the scanning operation of the track), and at the same time, a driving start signal is output to the memory controller 6 and the counter 8. Upon reception of the driving start signal, the memory controller 6 enables a write access to the memories 9 and 10, and the counter 8 is reset and starts a new count operation.

Upon movement of the card, when the leading read beam 2A catches a pit on the track on the optical card 1, one read signal generating cell outputs a read signal corresponding to the pit on the track, and the read signal is supplied to the A/D converter 4. Then, a binary signal RBIN-A of the read signal is output from the A/D converter 4 by a known method such as differential, zero-crossing detection, and the like. Every time a binary signal RBIN-A is output from the A/D converter 4, the memory controller 6 supplies a write enable signal WE to the memory 9 and instructs it to store the output from the counter 8. In this manner, since the memory 9 stores the count value of the counter 8 every time a binary signal RBIN-A is output, each value stored in the memory 9 corresponds to the position of a pit measured from the position of the read beam 2A at the beginning of the card driving operation.

Thereafter, when the optical card 1 further moves, and the trailing read beam 2B from the optical head 2 catches a pit on the track on the optical card 1, the other read signal generating cell outputs a read signal corresponding to the pit on the track, and the read signal is supplied to the A/D converter 5. The A/D converter produces a binary signal RBIN-B. Every time a binary signal RBIN-B is output from the A/D converter 5, the memory controller 6 supplies a write enable signal WE to the memory 10, and instructs it to store the output from the counter 8. In this manner, since the memory 10 stores the count value of the counter 8 every time a binary signal RBIN-B is output, each value stored in the memory 10 corresponds to the position of a pit measured from the position of the read beam 2B at the beginning of the card driving operation.

Thereafter, when the optical head 2 reaches the other end (ends the scanning operation for one track), the control circuit 11 reads out data stored in the two memories 9 and 10, executes data processing in the order of detection of pit intervals, detection of the head position of a data portion, detection of a sync portion, detection of speed, correction of pit intervals based on the speed, and modulation of the corrected pit interval data on the basis of the readout data, and outputs final read data.

For this purpose, the control circuit 11 executes the following processing. After the memories 9 and 10 store data for one track, the control circuit 11 reads out the stored data, detects a blank portion, a preamble portion, and a sync portion (to be described later) in a state without any speed correction, and detects the head position of a track number and the head position of recording data.

Figure 6:
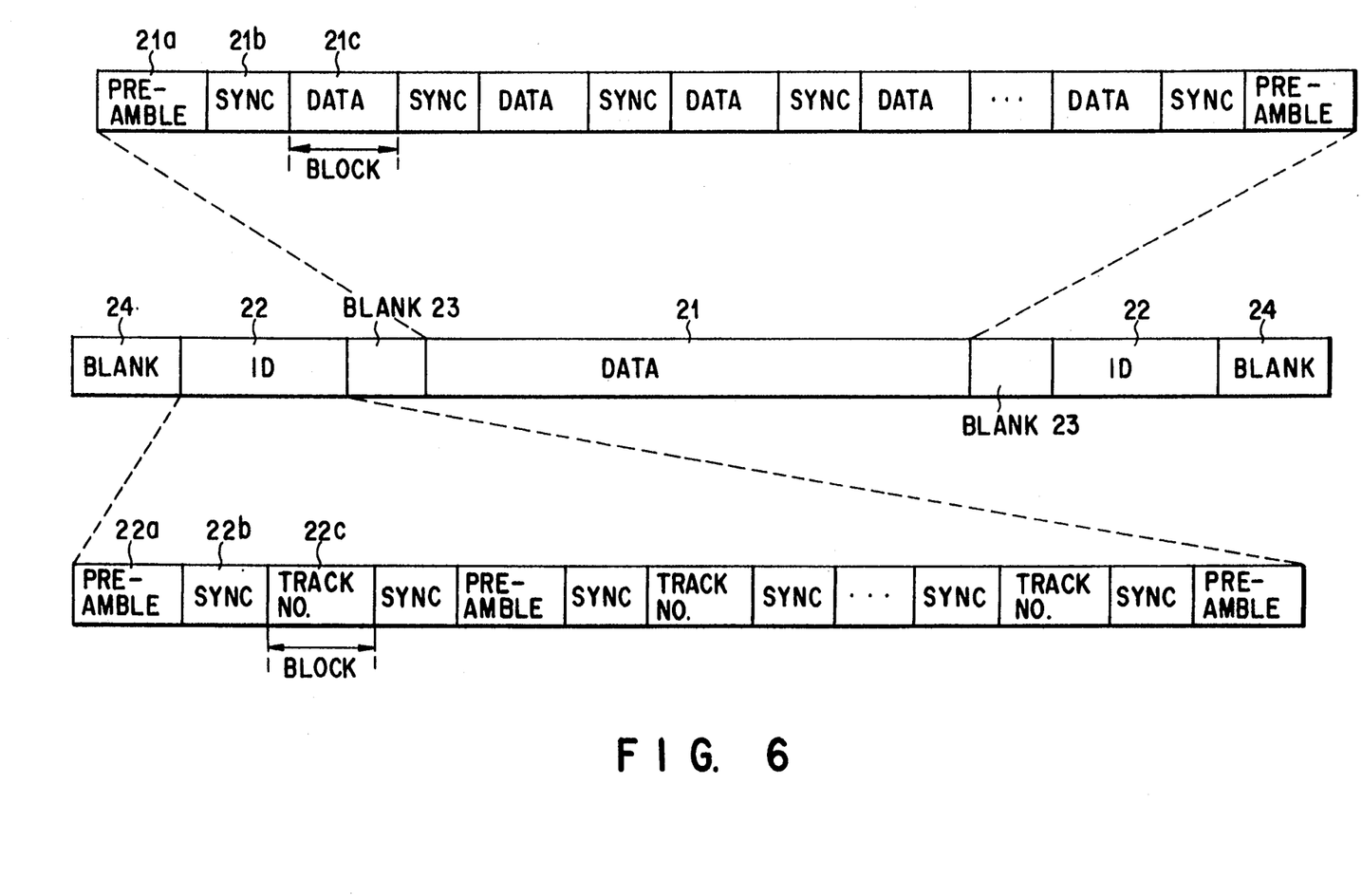
FIG. 6 is a view showing the format of one track on an optical card used in the present invention.

Upon reading of data, the track number and recording data need only be accurately read. In order to realize stable and reliable reading, blank, preamble, and sync portions are recorded on each track. Although these portions vary more or less depending on the format of an optical card, in general, a data portion 21 is assigned at the central portion, and two ID portions 22 are assigned at the two end portions of each track, as shown in FIG. 6. A blank portion 23 is sandwiched between the data portion 21 and each ID portion 22, and a blank portion 24 is assigned at each end portion of the track. The latter blank portion 24 is longer than the blank portion 23, and each of the blank portions 23 and 24 has no pit formed therein. Thus, the carry is continuously written into the memories 9 and 10 when the blank portions 23 and 24 are reproduced.

In the ID portion 22, a track number sandwiched between sync portions which are, in turn, sandwiched between preamble portions is repetitively recorded. In this case, an identical track number is repetitively recorded. In the data portion 21, many data blocks sandwiched between sync portions are recorded. Preamble portions are recorded at the two ends of the data portion 21. The reason why the preamble portions are assigned at the two ends of the ID portion 22 and the data portion 21 is to allow bidirectional read accesses. The reason why sync portions are assigned at the constant interval in both the ID portion 22 and the data portion 21 is to achieve synchronization again even when synchronization pulls out due to, e.g., dust. In each of the ID portion 22 and the data portion 21, the data length of one block is predetermined. For example, before modulation, the data length of the ID portion 22 is determined to be 30 bytes, and that of the data portion 21 is 36 bytes. A predetermined number of such blocks form data for one track. Therefore, as a reading procedure, in order to detect the track number or recording data, a sync portion is detected first, and the head or end position of the track number or recording data can be detected based on the sync portion. Note that the above-mentioned format is merely an example, and if a different format is adopted, a pattern arranged in correspondence with the format is to be detected.

Furthermore, the control circuit 11 establishes a pit-to-pit correspondence detected by the leading and trailing read signals using the last pit in the detected sync portion as the head pit, and calculates the difference between count values corresponding to a certain pit (a time difference from when the leading read beam has passed a certain pit until the trailing read beam passes the pit: since the interval between the two beams is constant, the time difference corresponds to the moving speed of the card), thus obtaining speed data. Thereafter, the control circuit 11 calculates pit positions and intervals of the adjacent two pits from one of the two read signals, and corrects interval data based on the speed data, thereby obtaining a reproduced signal free from a speed variation.

The control circuit 11 detects the preamble and sync portions in a state wherein correction for a speed variation is not performed, after normalization and statistical processing (to be described later). The preamble and sync portions are detected on the basis of a predetermined number of pit detection data. In this case, the detection data are normalized with the average moving speed of the card during detection, a statistical amount representing the degree of coincidence between the normalized data and the pattern of the preamble or sync portion is calculated, and the calculation result is evaluated, thereby detecting the preamble or sync portion.

Furthermore, upon detection of a sync portion in the leading and trailing read signals, the control circuit 11 establishes a pit-to-pit correspondence using the detected sync portion as a head position, and calculates the difference between the corresponding pits, thereby obtaining speed data. In order to maintain a consistent correspondence, when the obtained speed data become discontinuous, the control circuit 11 determines that a pit detection failure has occurred, and shifts the pit-to-pit correspondence between the two data. For example, when pit detection failure is detected while establishing a pit-to-pit correspondence by scanning data from the right end to the left end of a track, the following method is used. That is, the pit-to-pit correspondence is reestablished by scanning data from the left end to the right end of the track. Since a large number of sync portions are included at a constant interval in the data portion and ID portion, a speed detection error can be prevented from propagating to the following processing by reestablishing a pit-to-pit correspondence every time one sync portion is detected.

As described above, the control circuit 11 acquires data associated with the moving speed of the optical card on the basis of the difference between the output timings of the binary signals corresponding to the leading and trailing read beams, extracts data associated with the interval between adjacent pits (more directly, the time interval) from one of the leading and trailing binary signals, and corrects the extracted pit interval on the basis of the speed data. The corrected pit interval is demodulated according to a modulation rule, thus completing reading. The demodulation is known to those who are skilled in the art.

Figure 7:
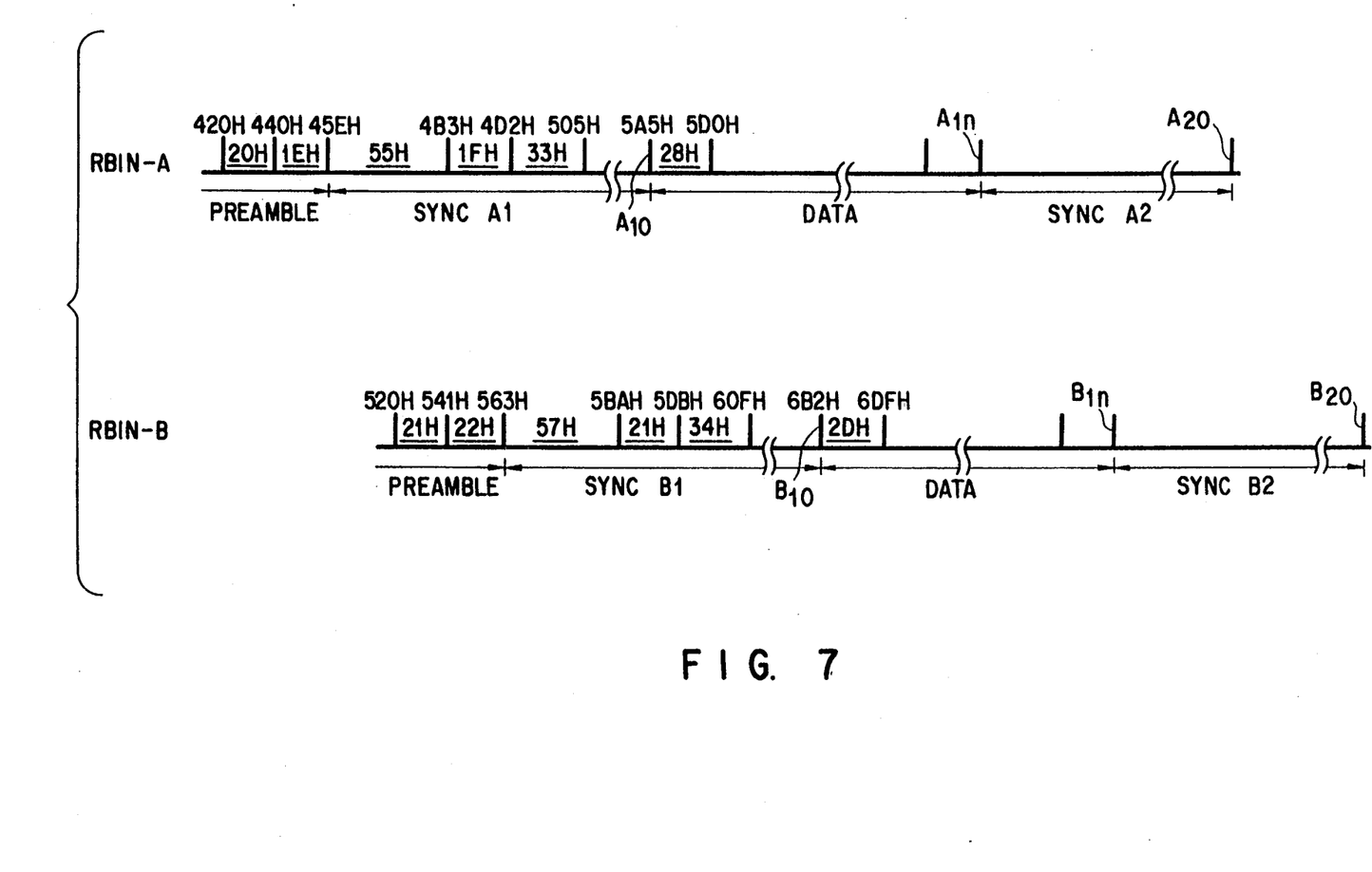
FIG. 7 is a view showing an example of storage data in the memory in the first embodiment.

FIG. 7 shows an example of data respectively stored in the memories 9 and 10, and an example of differences (pit interval data) between adjacent data of those stored in the memories 9 and 10. Referring to FIG. 7, a chart RBIN-A represents the binary signal corresponding to the leading read beam, and a chart RBIN-B represents the binary signal corresponding to the trailing read beam. In these charts, values (420H, 440H, . . . ) and (520H, 541H, . . . ) shown in upper portions represent count values output from the counter 8, which values are stored in the memories 9 and 10 when the binary signals are output, and underlined values (20H, 26H, . . . ) and (21H, 22H, . . . ) shown between the count values represent the pit interval values. The sync portions, the track number, the head position of data are detected based on pit interval data, and the speed data is detected based on the count values stored in the memories 9 and 10. When a pit correspondence is established, the speed data is detected by calculating the difference between the values stored at the same address position in the memories 9 and 10.

The format for one track shown in FIG. 6 will be explained below. In the ID portion 22, a track number (Tr) is recorded. The blank portion 23 of about 4 mm is assigned between the ID portion 22 and the data portion 21. The ID portions 22 at the two ends of the data portion 21 record the same data, and can be similarly recognized from either the left or right end of the track. Also, the blank portions 24 are formed between the right and left ends of the card and the corresponding ID portions 22. Note that in a write-once type recording medium, the ID portions 22 are recorded in the manufacture of a card, and the data portion 21 is recorded later with a laser beam by a write means.

The track number and the head position of recording data are final targets of detection. Upon detection of these data, the position of a sync portion need only be detected. However, as can be seen from the format, blank and preamble portions need be detected prior to the detection of the above-mentioned data.

In the format shown in FIG. 6, assuming that the optical head is located at one end portion (the left end in FIG. 6) of the card in an initial state, and the scanning operation of the optical head is started by moving the card to the left in FIG. 6, a head preamble portion 22a in an ID portion 22 is detected to find the head position of the ID portion after detection of a blank portion 24, and thereafter, a sync portion 22b is detected to perform speed detection and correction for data of a track number 22c.

Furthermore, a blank portion 23 is detected, and a head preamble portion 21a in a data portion 21 is detected to find the head position of the data portion. Thereafter, a sync portion 21b is detected, and speed detection and correction are performed for recording data 21c. Since the blank portion 23 is present between the ID portion 22 and the data portion 21, the ID portion 22 or a head preamble portion 21a in the data portion 21 may be detected to find the head position of the ID or data portion. Thereafter, a sync portion may be detected to independently perform speed detection and correction.

Detection of the blank portions 24 and 23 will be described below. The blank portion 24 is longer than the blank portion 23. For either blank portion, the memories 9 and 10 store carries at a constant interval. Therefore, the blank portions 24 and 23 can be detected by detecting that carries are stored in the memories 9 and 10. Carries are generated at an interval slightly exceeding 80 $\mu$m. Therefore, carries are continuously recorded in the memories 9 and 10 by a number obtained by dividing the blank length with 80 $\mu$m. For example, if the length of the blank portion 24 is 4 mm, almost fifty carries are detected. Even when dust or the like is detected in the blank portion 24, it can be easily distinguished from data by discriminating its interval. In the blank portion 23, carries are generated in the same manner as in the blank portion 24, except that the blank portion 23 has a length (e.g., about 500 $\mu$m) smaller than that of the blank portion 24. Therefore, the blank portion 23 can be similarly detected. The number of carries in the entire blank portion 23 is about 6.

When a blank portion 24 is discriminated, the head preamble portion 22a in the ID portion 22 is detected.

Figure 8:
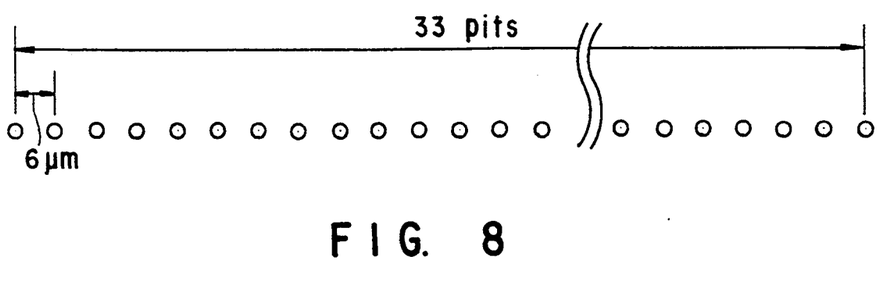
FIG. 8 is a view showing a preamble portion of the optical card used in the first embodiment.

FIG. 8 shows the arrangement of the preamble portion 22a. Note that all preamble portions have the same arrangement. The preamble portion normally has a pattern in which a predetermined number of pits are arranged at the shortest interval defined by the modulation rule (in this case, 6 μm), and is used for synchronously pulling in clocks of a reading device with a read signal. Assuming that the preamble portion consists of 33 pits, if, for example, 17 pits at an equal interval are detected, this pattern is discriminated to be a preamble portion. For this purpose, an average value Xm of a predetermined number of (e.g., 16) interval data Xi to be discriminated of pit interval data which are extracted in advance is calculated.

$$Xm = \sum_{i=0}^{15} Xi/16 \tag{1}$$

The differences between each data and the average value are squared, and are totaled.

$$D = \sum_{i=0}^{15} (Xi - Xm)^2 \tag{2}$$

The value D represents the deviation of each data from the average value, and naturally assumes a small value if pits are arranged at the same interval. For example, if no speed variation occurs, since pits are aligned at a constant interval, the value D assumes zero. As the speed variation becomes larger, the value D tends to increase. Therefore, if the value D is equal to or smaller than a predetermined value in consideration of an expected maximum speed variation, a preamble portion can be determined.

A standard value Dc as a criterion for discriminating the value D is determined as follows. Assuming that the interval of the clock pulse of the time counter 8 is 2 μs (the frequency of the oscillator 7 is 500 kHz), and the moving speed of the card is 100 mm/s, if no speed variation occurs, the pit interval Xi of the preamble portion is given by:

$$Xi = 6 \; (\mu m)/100 \; (mm/s)/2 \; (\mu s)$$
$$= 30 \; (counts)$$

Also, let calculate a value Dcp of a squared deviation value D defined by Equation 2 when the card moving speed varies. It is assumed that a speed variation in a 16-pit period is 8%, and Xi is 30. The value Dcp is calculated on the basis of a squared sum of $(8^i/16)\%$ of Xi (i=1 to 16).

$$\begin{aligned} Dcp &= (1 \times 0.08/16 \times 30)^2 + (2 \times 0.08/16 \times 30)^2 + \\ & \quad \ldots + (16 \times 0.08/16 \times 30)^2 \\ &= 33 \end{aligned} \tag{3}$$

Therefore, if the speed variation is not larger than 8%, the value D for the preamble pattern is not larger than 33. However, if 16-pit interval data include only one 8 μm interval pit (all other pits have a 6 μm pit interval) and the speed is constant, the value D for a non-preamble portion is about 93. Therefore, in order to allow discrimination of such a case, the standard value Dc is set to be a numerical value which is larger than 33 and is smaller than 93, e.g., 60. D and Dc (=60) are compared with each other, thereby discriminating whether or not the detected pattern is a preamble portion. Therefore, D is calculated from the head position of pit interval data, and a portion where D<Dc is satisfied first immediately after a blank portion 24 or 23 can be discriminated to be a preamble portion.

In this embodiment, the preamble portion can be reliably detected from data including a speed variation. In addition, even if dust, a defect, or the like is present between the driving start point and the preamble portion, and binary outputs are randomly generated, the influence of such random outputs can be eliminated.

Figure 9:
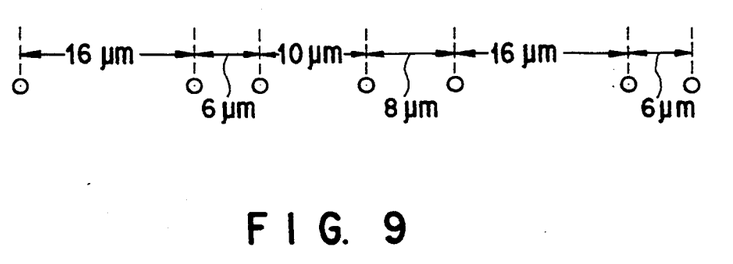
FIG. 9 is a view showing a sync portion of the optical card used in the first embodiment.

Then, the sync portion 22b is detected. The sync portion 22b is detected from pit interval data which are extracted in advance in the same manner as in detection of the preamble portion. FIG. 9 shows an example of the sync portion 22b. Note that all sync portions have the same pit pattern. Unlike in the preamble portion, the sync portion is defined by a combination of different predetermined intervals in place of a constant pit interval. Discrimination for detecting the sync portion is executed based on a principle different from that for discrimination of the preamble portion.

In detection of the sync portion, the number of pit intervals to be detected is 6, the degree of coincidence between a pattern of six pit interval data and the sync pattern shown in FIG. 9 is calculated, and the calculation result is evaluated. When the ratio of the intervals in the sync portion pattern shown in FIG. 9 is calculated, we have 16:6:10:8:16:6=8:3: 5:4:8:3. In the calculation of the degree of coincidence, a sum of six interval data Xi is normalized. The normalization is performed based on a total value (8+3+5+4+8+3=31) of the smallest values representing the ratio.

$$m = \sum_{i=0}^{5} Xi/31 \tag{4}$$

Assuming that no speed variation is present, m is 10. When the speed varies in the direction to increase, m tends to decrease.

The smallest values representing the ratio of the intervals in the sync pattern are multiplied with m, and a square sum of the differences between the products and the six pit interval data to be detected is calculated.

$$Ds = \sum_{i=0}^{5} (Xi - m \times Xsi)^2 \tag{5}$$

Equation (5) is calculated for the sync pattern shown in FIG. 9. Xsi are the smallest values (8, 3, 5, 4, 8, 3) representing the ratio of the intervals in the sync pattern are multiplied with m.

$$DS = (X_0 - 8 \times m)^2 + (X_1 - 3 \times m)^2 + (X_2 - 5 \times m)^2 + (X_3 - 4 \times m)^2 + (X_4 - 8 \times m)^2 + (X_5 - 3 \times m)^2 \tag{6}$$

Since the sync pattern is detected based on the squared sum of the difference between the pit interval data and product of the smallest values representing the ratio of the intervals in the sync pattern and m, even if the card moving speed changes, the influence of the change can be eliminated.

A standard value Dcs for discriminating the value Ds is determined as follows. Assuming that the period of the clock pulse of the counter 8 and the moving speed of the card are respectively 2 μm and 100 mm/s, since the total length of the sync portion is 62 μm, if no speed variation occurs, a count value corresponding to the interval m (=2) is:

$$62 \ (\mu m)/100 \ (mm/s)/2 \ (\mu m)/31 = 10 \ (count)$$

If an average speed in a very small range (6-pit period) is 100 mm/s (m=10), the speed variation is 3%, and the speed linearly changes during this period, the value Ds is calculated as follows:

$$\begin{aligned} Dcs &= (8 \times 0.03 \times 80/31)^2 + (11 \times 0.03 \times 30/31)^2 + \\ & \quad (16 \times 0.03 \times 50/31)^2 + (20 \times 0.03 \times 40/31)^2 + \\ & \quad (28 \times 0.03 \times 80/31)^2 + (31 \times 0.03 \times 30/31)^2 \\ &= 7 \ (counts) \end{aligned} \quad (7)$$

For example, if one of the intervals is larger by 2 μm than the regular interval, the value Dcs is at least 67 and it can be easily determined that the detected pattern is not a sync portion.

When the degree of coincidence with the sync pattern is calculated using equation (5), and is compared with Dcs, the position of a sync portion in the binary signals RBIN-A and RBIN-B for one track (more directly, the address of the memories which store time data corresponding to the position) is detected, and the position of the last pit, i.e., the address (the order from the head position of data) is recorded. As shown in the format in FIG. 6, the track number or recording data follows the sync portion. If the last pit of the sync portion is detected, this means that the track number or the head position of recording data can be detected. Each of the track number and recording data is arranged between the sync portions, and can be detected by reading from either the left or right end.

The detection operation of the sync portion will be described below with reference to FIG. 7. A sync portion A1 is detected from pit interval data in the memory 9 which stores the binary signal RBIN-A corresponding to the leading read beam. The address of the memory 9 which stores data 5A5H of a last pit $A_{10}$ in the sync portion A1 is recorded. Then, a sync portion A2 is detected, and the address of the memory 9 which stores data of a last pit $A_{20}$ of the sync portion A2 is recorded. Thereafter, sync portions are detected from data for one track, and the addresses of the last data in the detected sync portions are recorded. The sync portions and the addresses of their last pits are similarly detected and stored respectively on the basis of pit interval data in the memory 10 which stores the binary signal RBIN-B corresponding to the trailing read beam. These addresses are used for detecting the head positions in the speed detection processing.

Detection of speed will be described below. The detection is performed between data (accumulated counts from the driving start point to the output timings of binary signals) stored in the memories 9 and 10. Basically, a time interval required when a single pit passes across two detectors is detected. In order to establish a correspondence between identical pits in the two read signals, the last pits in sync portions having the same number (A1 and B1) when viewed from the head position of data are used as head pits. Of data stored in the memories 9 and 10, data stored at addresses corresponding to the last pits in the first sync portions are used as head data, and the differences between corresponding data are calculated up to the head pits of the next sync portions.

As shown in FIG. 7, since the address of data corresponding to the last pit $A_{10}$ in the first sync portion A1 in the memory 9 is detected in advance, it is used as the head address. In other words, the head position is determined. Similarly, the head position is determined using the address of data corresponding to the last pit $B_{10}$ in the first sync portion B1 in the memory 10. Data corresponding to pits from the last pit $A_{10}$ in the first sync portion A1 to a pit $A_{ln}$ (the head pit in the second sync portion A2) in the memory 9 are caused to correspond to data corresponding to pits from the last pit $B_{10}$ in the first sync portion B1 to a pit $B_{ln}$ in the memory 10, and $B_{10}-A_{10}, B_{11}-A_{11}, B_{12}-A_{12}, \ldots, B_{ln}-A_{ln}$ are calculated.

Then, data corresponding to pits from a last pit $A_{20}$ in the second sync portion A2 to a pit $A_{2n}$ (the head pit in the next sync portion: not shown) in the memory 9 are caused to correspond to data corresponding to pits from a last pit $B_{20}$ in the second sync portion B2 to a pit $B_{2n}$ (the head pit in the next sync portion: not shown) in the memory 10, and $B_{20}-A_{20}, B_{21}-A_{21}, B_{22}-A_{22}, \ldots, B_{2n}-A_{2n}$ are calculated. These ($B_{in}-A_{in}$) serve as speed data.

Thereafter, the differences between corresponding pits are calculated up to the head pit in the last sync portion, thus obtaining speed data for one track. If the distance between the leading and trailing detectors is 50 μm, and if no speed variation occurs, the detected speed data is:

$$50 \ (\mu m)/100 \ (mm/s)/2 \ (\mu s) = 250 \ (count)$$

Therefore, the bit width of each of the memories 9 and 10 requires 8 bits. If a speed variation occurs, speeds detected in turn have continuous values although this count value varies. As long as pits are similarly detected by the leading and trailing detectors (while establishing a one-to-one correspondence), even when dust or a defect is detected, or when a certain recording pit cannot be detected, there is no problem associated with at least speed detection. However, if a recording error pit is present, and can be detected by one detector but cannot be detected the other detector, the pit-to-pit correspondence can no longer be established for the following data.

In this embodiment, the pit-to-pit correspondence is established from the last pit in each sync portion to the head pit in the next sync portion as a unit. Therefore, when the pit-to-pit correspondence is disturbed in the middle of a block (from one sync portion to the next sync portion), the influence of the disturbed correspondence is absorbed in one block without propagating to the next and subsequent sync portions. Prior to speed detection, since the positions of two sync portions corresponding to the leading and trailing detectors are known, if the differences between two read signals at these positions are not equal to each other, the correspondence will be disturbed somewhere. However, at this time, the position of omission (or addition) of a pit at which the pit-to-pit correspondence is lost is unknown.

However, since speed data are detected, if the pit-to-pit correspondence is lost, a discontinuous point appears in detected speed data. In this embodiment, when the discontinuous point appears, a pit-to-pit correspondence is established from the head pit in the next sync portion to the discontinuous point in the reverse direction, thereby widening a normal detection range. As another method of establishing a correspondence between leading and trailing pits, a method of shifting the pit-to-pit correspondence assuming occurrence of pit omission is also effective.

Figure 10A:
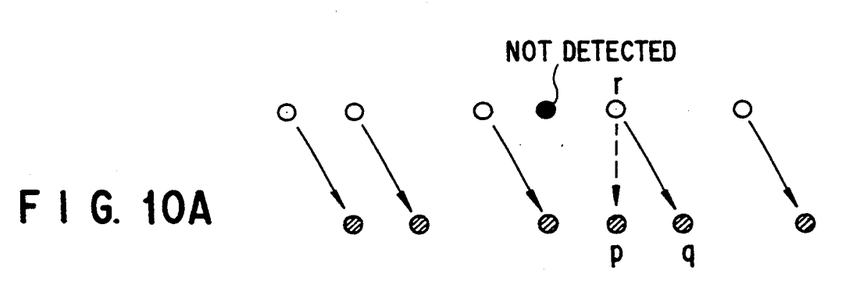
FIGS. 10A and 10B are views showing an operation for reestablishing the relationship between two pits detected by the two read beams when a pit is filed to be detected in the first embodiment.

FIG. 10A shows a case wherein only the leading read signal (white dots) suffers from pit omission, and the detected speed count immediately becomes smaller than the previous counts. In this case, in the trailing read signal (black dots), a trailing pit to be caused to correspond to a leading pit r is advanced by one from a pit "p" to a pit "q", thus establishing a pit-to-pit correspondence again. If the difference between the leading pit "r" and the trailing pit "q" is calculated, since the speed data can assume a continuous value, it can be determined that the pit-to-pit correspondence is reestablished.

Figure 10B:
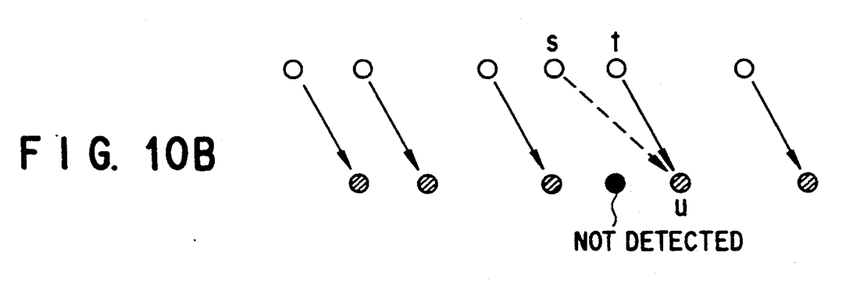

FIG. 10B shows a case wherein only the trailing signal suffers from pit omission, and the detected speed count immediately becomes larger than the previous one. In this case, a leading pit to be caused to correspond to a trailing pit "u" is advanced by one from a pit "s" to a pit "t", thus establishing a pit-to-pit correspondence again.

When a pit is added to either one of the two read signals, if it is considered that a pit is omitted from the other signal, this case can be classified into either of the above-mentioned cases in regard to the speed detection. A countermeasure against omission of one pit has been described. When several pits are omitted, the position to achieve a pit-to-pit correspondence can be shifted by several pits to achieve re-synchronization. However, when too many pits are omitted, since continuity can no longer be determined based on the speed before omission, for example, they must be processed as an error.

Correction of pit interval data based on speed data will be described below. If the detected speed is assumed to be count v, data which does not include any speed variation can be obtained by multiplying bit interval data with a standard count (=250)/v. Several methods for determining the relationship between the detected speed and the pit corrected by the detected speed may be proposed. In this case, a method of correcting the interval between a pit subjected to speed detection and the next pit will be described below with reference to FIG. 7. A speed count "269" is detected from the difference between pits $A_{10}$ (5A5H) and $B_{10}$ (6B2H). This speed count value indicates that the speed is lower than a standard speed "250". Using this result, an interval 2BH between the pit $A_{10}$ and the next pit $A_{11}$ is corrected as follows:

$$\text{Corrected value of pit interval} = 2BH \times 250/269$$
$$= 28H$$

Thereafter, correction is similarly performed, and the influence of the speed variation can be canceled. The correspondence between the pit and speed data is associated with the frequency of the speed variation. When the variation period is long, speed correction data need not be set for each pit interval. For example, speed detection may be sampled so that one speed data is obtained for several pit interval data. The track number or recording data is arranged between the last pit of one sync portion to the head pit of the next sync portion, and pit intervals of pits in the track number or recording data are corrected, thus obtaining reliable pit interval data. The data from which speed variation components are corrected are demodulated according to the predetermined modulation rule, as described above, thus obtaining final data.

According to this embodiment, even when the moving speed of an optical recording medium varies, or when a defect or dust is present on a recording medium, recording data can be stably and reliably read. In addition, even when detected speed data become discontinuous during reading, a non-readable range can be suppressed to a predetermined range. Speed data are acquired by establishing a pit-to-pit correspondence between the two data from one sync portion to the next sync portion as a unit. When detected speed data include a discontinuous point within this unit, the correspondence is reestablished from the head pit in the next sync portion in the reverse direction, thus obtaining accurate pit interval data without causing any errors. Therefore, according to this embodiment, even when a discontinuous point appears, propagation of an error to the following detection can be prevented by simple processing. With this correction, as long as the speed variation has a variation period exceeding the interval between the two detectors within the resolution of the time base, variations can be corrected regardless of their magnitudes. As compared to a conventional reading circuit system which has a correctable speed variation limit of in order of 10%, cost of a card driving mechanism/circuit can be greatly reduced. Since the card driving mechanism is simplified, the size and weight of the apparatus can also be reduced. Furthermore, when a plurality of discontinuous points appear, the position (correspondence) of a leading or trailing pit is advanced by utilizing continuity of the detection speed so as to reestablish a pit-to-pit correspondence, thereby achieving re-synchronization. Thus, propagation of an error can be prevented.

If the ID portion at the end portion of a track must be read, the head position may be found by detecting a preamble portion as in the ID portion at the head portion of the track, and speed detection/correction may be independently performed. In the above description, the card driving direction is fixed. However, if the driving direction is reversed, the relationship between the binary signals RBIN-A and RBIN-B may be replaced with each other. For this purpose, the hardware arrangement need not be changed at all, and the relationship between the memories 9 and 10 need only be reversed upon extraction of speed data by the control circuit 11.

The second embodiment will be described below. In the first embodiment, the detection range is not limited. Therefore, if a pit detection error occurs, a pattern which is not a sync portion may be erroneously recognized as a sync portion due to erroneous detection caused by pit omission (such an error tends to occur when the sync pattern is simple). When the sync pattern is simple and includes many Jitter components, and a single standard value for an evaluation value cannot be determined within one track, if discrimination is made using a fixed standard, a pattern which satisfies the standard value for the first time is discriminated to be a sync portion, resulting in a discrimination error. Therefore, the second embodiment which can reliably reproduce constant pattern data such as a sync portion recorded on an optical recording medium such as an optical card will be described below.

The arrangement of a reproduction apparatus and the format of the optical card according to the second embodiment are the same as those in the first embodiment, and a detailed description thereof will be omitted.

The operation of the second embodiment will be described below. In the second embodiment as well, like in the first embodiment, a beam is located at one end of a desired track on the optical card 1, and focus and track servo control operations are started. Then, the card driving circuit is instructed to drive the optical card 1 in its longitudinal direction. Thus, the card driving circuit starts the card driving operation, and at the same time, the driving start signal is output to the memory controller 6 and the counter 8. The memory controller 6 enables write accesses to the memories 9 and 10, and the counter 8 is reset and starts a new count operation.

When a leading read beam from the optical head 2 catches a pit on the track on the optical card 1, one read signal generating cell outputs a read signal corresponding to the pit on the track. When this read signal is supplied to the A/D converter 4, a signal RBIN-A obtained by binarizing the input read signal by a known method such as differential, zero-crossing detection, and the like is output. Every time a binary signal RBIN-A is output, the memory controller 6 supplies a write enable signal to the memory 9, and instructs it to store the output from the counter 8.

Thereafter, when the optical card 1 is further driven, and a trailing read beam from the optical head 2, in turn, catches a pit on the track on the optical card 1, the other read signal generating cell outputs a read signal corresponding to the pit on the track. When this read signal is supplied to the A/D converter 5, a signal RBIN-B obtained by binarizing the input read signal is output. Every time a binary signal RBIN-B is input, the memory controller 6 supplies a write enable signal to the memory 10 and instructs it to store the output from the counter 8.

When the optical head 2 has reached the other end of the track, the control circuit 11 reads out data stored in the two memories 9 and 10, and executes data processing in the order of detection of the head position of data, detection of a sync portion, detection of speed data, correction of pit interval data based on speed data, and demodulation on the basis of the readout data, thus outputting final read data.

The above-mentioned processing operations in the control circuit 11 will be described below. The data format of one track is the same as that in the first embodiment shown in FIG. 6. More specifically, the data length of the ID portion for one block is 30 bytes, and that of the data portion is 36 bytes.

First, the head position of data is detected. Detection of a preamble portion in the second embodiment is performed based on D (Equation (2)) as a square sum of the differences between an average value of 16 bit interval data and the respective interval data as in the first embodiment. If the value D is equal to or smaller than a standard value, a preamble portion, i.e., the head position of a data portion is detected. When a plurality of data portions are present in one track, each data portion can be discriminated while recognizing a blank portion by detecting continuously recorded carry signals, as needed.

Then, a sync portion is detected. In this case, if an 8-10 modulation method is adopted as a modulation method, 8-bit non-modulated data (data word) is converted into 10-bit modulated data (code word), and the converted data is recorded on the track of the card. If the length of one bit of the code word on the card is assumed to be 4 μm, one code word length is 4 μm×10=40 μm, and hence, one block length as a basic unit of the recording format is:

40 μm×30=1,200 μm (ID portion) 40 μm×36=1,440 μm (data portion)

This means that one block length on the card is 1,200 μm (ID portion) or 1,440 μm (data portion), and hence, sync portions are recorded to be separated by this interval. Thus, the detection range of a sync portion is calculated. Since the first sync portion is present immediately after a preamble portion, the detection range is calculated for a sync portion after the preamble portion. If the detection range is defined to be a range of ±10% from a certain (time) position of a possible sync portion in consideration of a speed variation, and driving speed of medium is 100 mm/s and a one count of the counter corresponds to 1 μs, the position of the possible sync portion is separated from the position of a certain sync portion by:

1,200 (μm)/100 (mm/s)/1 (μs) = 12,000 (counts)
(for ID portion)

1,440 (μm)/100 (mm/s)/1 (μs) = 14,400 (counts)
(for data portion)

If a margin of ±10% is considered for these counts, it can be expected that the sync portion appears at the following count value intervals:

11,800 to 13,200 counts (for ID portion)
12,960 to 15,840 counts (for data portion)

Data stored in the above-mentioned memories 9 and 10 correspond to the values of the counter 8 every time a binary signal is output. Since each count value is a value from the card driving start point, if detection is performed within a count range of 11,800 to 13,200 (for the ID portion) or within a count range of 12,960 to 15,840 (for the data portion) with reference to a value corresponding to the head pit in the first sync portion, the sync portion can be efficiently detected.

Figure 11:
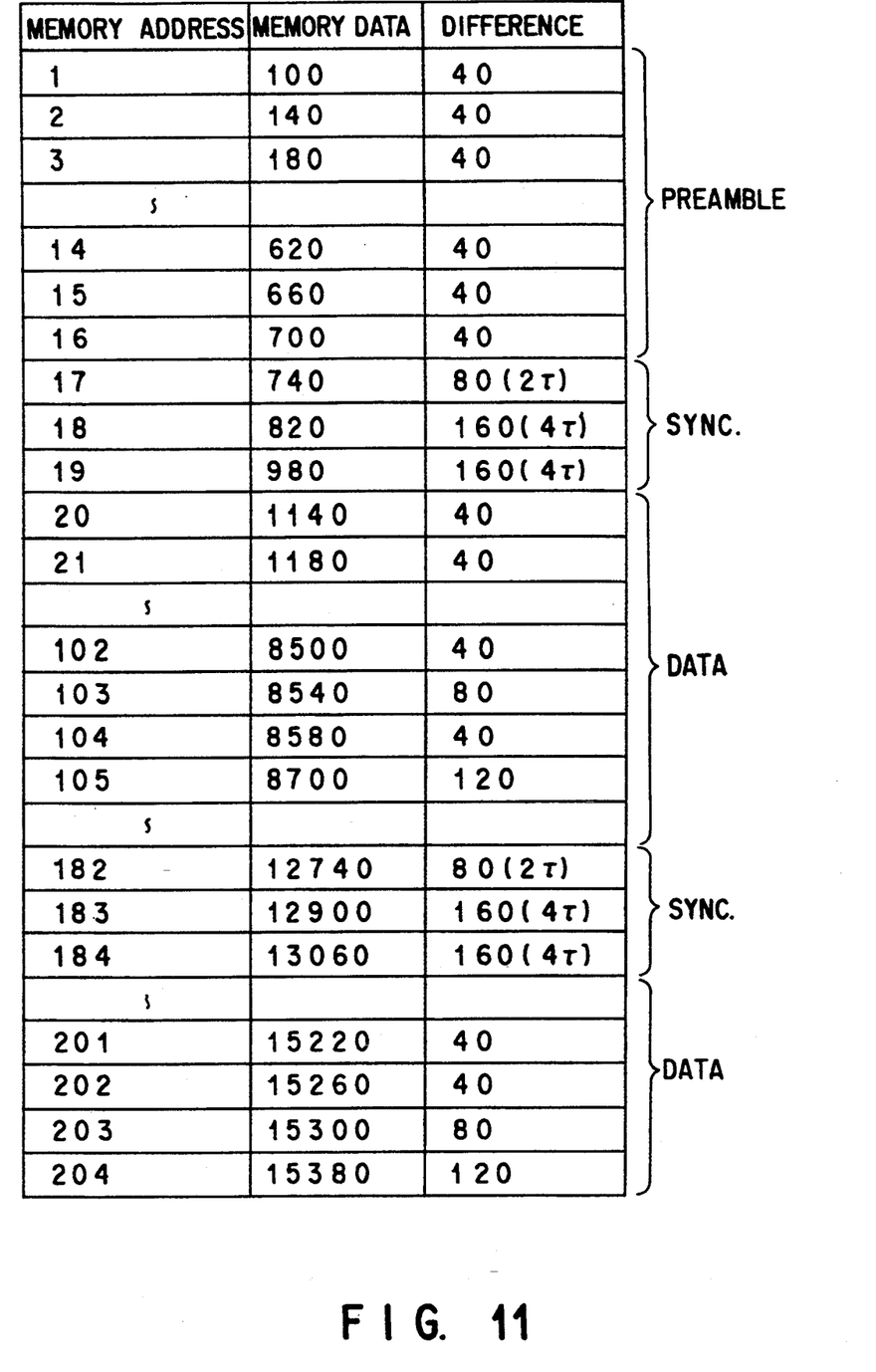
FIG. 11 is a view showing storage data in a memory according to the second embodiment.

Detection of a sync portion in the ID portion will be described below with reference to FIG. 11. The leftmost column indicates the addresses of the memory 9 (or 10), and the middle column indicates memory data at the corresponding addresses. FIG. 11 shows a case where no speed variation is assumed to be present. The memory data (=100) at the start address (address 1) indicate a time from the driving start point until the first data appears, and may assume various values in practice. The rightmost column in FIG. 11 indicates the differences between each two adjacent memory values, i.e., actual pit lengths or pit intervals.

A portion from address 1 to address 16 where equal differences are stored is a preamble portion, and minimum pit lengths (or intervals) τ(=40) continuously appear in this portion. The following three addresses 17, 18, and 19 correspond to a sync portion, which is constituted by pits at intervals of 80 (2τ), 160 (4τ), and 160 (4τ). A data portion follows the sync portion. Another sync portion is present at the position of count 12,000 from the first sync portion. In this manner, sync portions are recorded at a constant interval. Since the memory value at the head pit in the first sync portion is 740, the next sync portion starts from the count position of 740+12,000=12,740 (counts). If neither a speed variation nor a pit detection error occur, the values stored in the memory 9 or 10 are checked in turn, and since the differences corresponding to the addresses of counts 12,740 to 13,060 are 80 (2τ), 160 (4τ), and 160 (4τ), the next sync portion will be detected.

However, in practice, since the medium driving speed varies, the next sync portion may not often be located at this position, and detection is performed for difference data corresponding to counts 11,800 to 13,200 by checking the memory data in turn in consideration of the margin of ±10%, as described above. If a sync portion is detected within this range, 12,000 are added to the head value, and then, the next sync portion is detected within the obtained count range with a margin of ±10%. The above-mentioned operation is similarly repeated, thereby detecting all sync portions in the ID portion. The same applies to detection of sync portions in the data portion.

Figure 12:
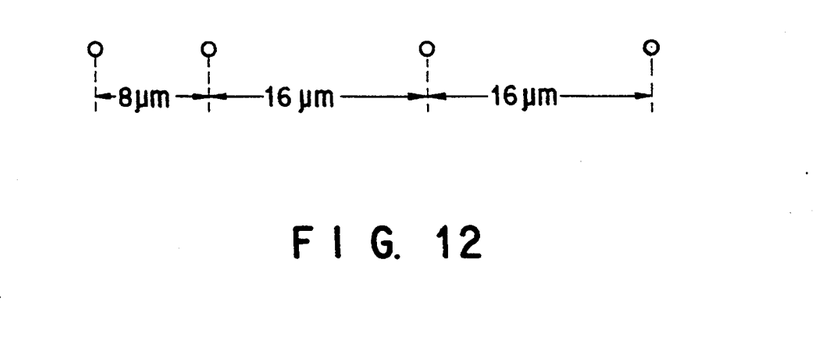
FIG. 12 is a view showing a pattern of a sync portion in the second embodiment.

Then, discrimination of each sync portion is performed. In this case, the discrimination is performed as follows on the basis of the degree of coincidence between a pattern of pits and the pattern of the sync portion. In this case, since the pattern of the sync portion consists of three interval data 2τ, 4τ, and 4τ, as shown in FIG. 12, the following values are calculated as evaluation values.

(1) A count value per τ when three interval data are assumed to define a sync pattern is calculated. If no speed variation is present, and the three interval data correspond to a sync portion, it can be calculated as follows from values shown in FIG. 11:

$$(80+160+160)/(2+4+4)=40 \text{ (counts)}$$

(2) A multiplier when each interval data is expressed by τ (=40) is calculated. If no speed variation occurs, and the three interval data correspond to a sync portion, it can be calculated as follows:

$$80/40=2, 160/40=4, \text{ and } 160/40=4$$

(3) Then, a total of deviations of actual pit data from the value obtained above calculations (1) and (2) is calculated as an evaluation value. If the values of three interval data are represented by X1, X2, and X3, the following calculations are performed:
Evaluation value (EV2) $=2-X1/EV1+4-X2/EV1+4-X3/EV1$ (For EV1=(X1+X2+X3)/10)

EV1 corresponds to the value "m" in the first embodiment.

These calculations are performed for all continuous three pits within the detection range, and the calculation results are roughly selected and stored. In this case, as a criterion for this classification, if the variation of the absolute value of the speed for evaluation value EV1 is assumed to be, e.g., about ±20%, the standard range is 36 to 48, and the deviations of evaluation value EV2 and their start addresses of the memory for data whose EV1 falls in this range are stored.

Figure 13:
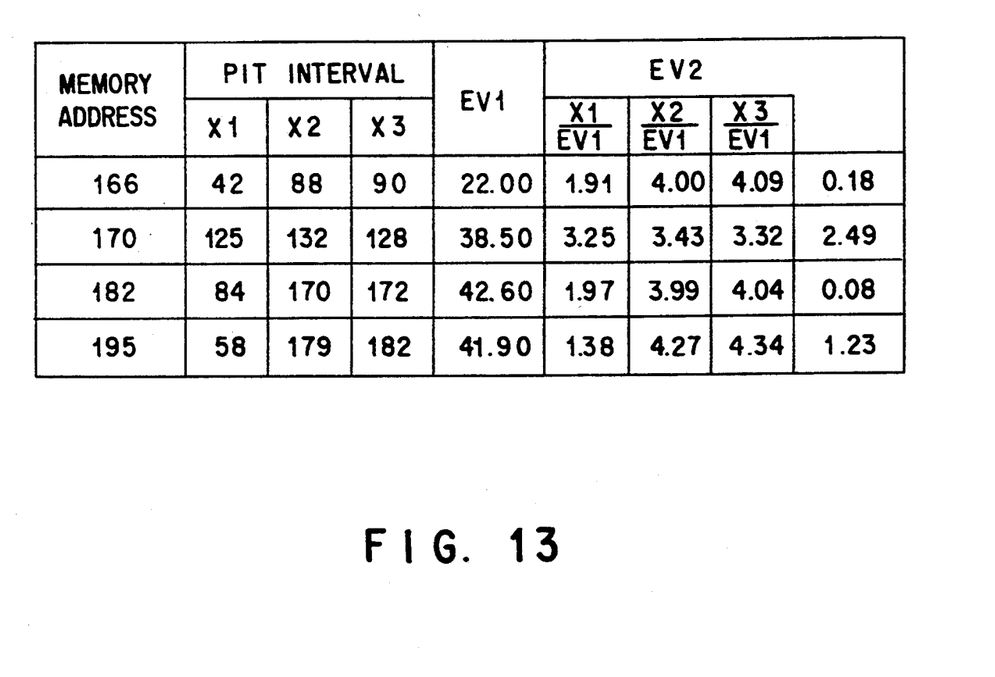
FIG. 13 is a view showing detection of the sync portion in the second embodiment.

For example, if a pattern shown in FIG. 13 is included in the detection range as a pattern similar to that of a sync portion, pit interval data at memory address "166" are 1τ, 2τ, and 2τ. Thus, the evaluation value EV2 (=0.18) is allowable, but the evaluation value EV1 (=22.00) falls outside an allowable range, and this pattern is excluded. Pit interval data at memory address "170" are 3τ, 3τ, and 3τ, and since evaluation value EV1 (=38.50) falls within an allowable range, this pattern is stored as a candidate. Pit interval data at memory address "182" are data of a sync portion to be detected, and since evaluation value EV1 (=42.60) falls within an allowable range, this pattern is stored as a candidate. Pit interval data at memory address "195" are 2τ, 3τ, and 4τ which have large jitter components, and since evaluation value EV1 (=41.90) falls within an allowable range, this pattern is stored as a candidate.

From these results, the pit interval data at three addresses "170", "182", and "195" are stored as candidates. In this case, by comparing the evaluation values EV2, pit interval data at address "182" which data have the smallest evaluation value EV2 can be determined to be a sync pattern.

Then, the next sync portion is similarly detected within a count range from 11,800 to 13,200 using the memory value "12,740" at the head position of this sync pattern as a standard value.

Thereafter, sync portions are detected by (the number of blocks +1) which defined by the format, and their addresses are recorded.

In the above description, detection of sync portions in the ID portion has been described. The same applies to the data portion. By repeating detection of the preamble portion, detection of the head sync portion, and detection of the next sync portion within a count range from 12,960 to 15,840 from a certain sync portion on the basis of data stored in the memories 9 and 10, all sync portions for one track can be detected.

Then, detection of speed data is performed. In this case, the same processing as in the first embodiment is performed using data stored in the memories 9 and 10, and the difference from the pit position (address) of a given sync portion as the head position to the head pit position (address) of the next sync portion is calculated on the basis of the leading and trailing read signals which are detected and recorded as described above. If the detected speed is assumed to be v (counts) and the standard count value is assumed to be 250, speed data free from any speed variation components can be obtained by multiplying pit length (or interval) data with (250)/v. The standard count value (=250) is obtained by dividing the detected distance on the card surface with the medium moving speed, and dividing the quotient with one period of the clock pulse of the counter 8.

The speed detected/corrected data is demodulated based on a predetermined modulation/demodulation rule, and is output as final data.

As described above, according to the second embodiment, an data pattern interval recorded at a predetermined interval on an optical recording medium is calculated from the format of recording data, the detection range of an data pattern in memory means is set using the calculated data pattern interval, the degree of coincidence between the data pattern and the memory data of the memory means within the detection range is evaluated, and the data pattern is discriminated on the basis of the evaluation result in accordance with a predetermined standard. Therefore, the probability of erroneous discrimination of a pattern such as a sync portion which is not an data pattern due to erroneous detection such as pit omission can be greatly reduced.

Since the degrees of coincidence between a data pattern and all data in the detection range are calculated, and data having the closest value is discriminated to be the data pattern, a first pattern which satisfies the standard due to jitter or dust can be prevented from being erroneously discriminated to be an data pattern unlike in conventional discrimination using a fixed standard value, and the probability of detection of an original data pattern can be greatly improved. Thus, the reading reliability of the apparatus can be remarkably improved, and the number of times of re-reading is decreased, thus achieving high-speed processing.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above description has been made for a specific format. However, when a single recording medium includes different formats, the sync portion position can be similarly calculated based on the block length of each format, and a detection range can be determined. In the second embodiment, the evaluation value EV2 is calculated as a total of deviations of all pit intervals. However, the present invention is not limited to this. For example, a square mean value of deviations may be calculated. Also, when the variation in recorded pits has dependence on the pit length (interval), three deviations may be weighted, and the weighted values may be totaled. According to the above description, it is assumed that the memories 9 and 10 has a capacity for only one track so that detection of pit intervals, detection of the head position of a data portion, detection of a sync portion, detection of speed, correction of pit intervals based on the speed, and modulation of the corrected pit interval data on the basis of the readout data are performed using the read out data from the memories 9 and 10 after the drive of the card is stopped. However, if the memory capacity is large, track scanning can be continuously performed and the data of the memory is simultaneously read out while data is written into the memory so that the reproduced data cane be compensated for speed variation in a real time manner.

What is claimed is:

1. An optical data reproducing apparatus for detecting a pit array including a predetermined number of pits formed on an optical data recording medium at predetermined intervals according to a predetermined rule, the apparatus comprising:
   means for detecting intervals of adjacent pits in the predetermined number of pits to detect a ratio of intervals of the predetermined number of pits; and
   means for calculating a degree of coincidence between the ratio of intervals detected by said detecting means and a ratio of intervals of the predetermined number of pits determined by the predetermined rule, thereby detecting the pit array based on the degree of coincidence.

2. An apparatus according to claim 1, wherein said calculating means comprises:
   first dividing means for dividing a total of the intervals of the predetermined number of pits detected by said detecting means by a total of numeral values representing the ratio;
   second dividing means for dividing the intervals of the predetermined number of pits by a quotient obtained by said first dividing means, respectively; and
   comparing means for obtaining the degree of coincidence between a ratio of quotients obtained by said second dividing means and the ratio of intervals of the predetermined number of pits determined by the predetermined rule.

3. An apparatus according to claim 2, wherein said comparing means comprises means for obtaining the degree of coincidence based on a total of difference between the ratio of quotients obtained by said second dividing means and the ratio of intervals of the predetermined number of pits determined by the predetermined rule.

4. An apparatus according to claim 1, wherein said calculating means comprises:
   dividing means for dividing a total of the intervals of the predetermined number of pits detected by said detecting means by a total of numeral values representing the ratio;
   multiplying means for multiplying the intervals of the predetermined number of pits by a quotient obtained by said dividing means, respectively; and
   comparing means for obtaining the degree of coincidence between a ratio of products obtained by said multiplying means and the ratio of intervals of the predetermined number of pits determined by the predetermined rule.

5. An apparatus according to claim 4, wherein said comparing means comprises means for obtaining the degree of coincidence based on a squared sum of the difference between the products obtained by said multiplying means and the intervals of the predetermined number of pits determined by the predetermined rule.

6. An apparatus according to claim 1, wherein
   said optical data recording medium comprises a pit array including a predetermined number of pits at constant interval; and
   said detecting means comprises means for periodically detecting intervals of adjacent pits.

7. An apparatus according to claim 1, further comprising:
   roller means for moving an optical card as the optical recording medium with regard to an optical head.

8. An apparatus according to claim 1, further comprising:
   belt means for moving an optical card as the optical recording medium with regard to an optical head.

* * * * *